Patented Sept. 7, 1943

2,328,711

UNITED STATES PATENT OFFICE 2,328,711

METHOD FOR STABILIZING ORGANIC THIONITRITES

George S. Crandall, Woodbury, N. J., Richard S. George, State College, Pa., and Edwin M. Nygaard, Woodbury, N. J., assignors to Socony-Vacuum Oil Company, Incorporated, New York, N. Y., a corporation of New York No Drawing. Application December 27, 1941, Serial No. 424,599

21 Claims. (Cl. 44—57)

This application, which is a continuation in part of our copending application, Serial No. 342,692, filed June 27, 1940, relates to the stabilization of organic thionitrites and is more particularly concerned with the stabilization of an organic thionitrite in solution in a suitable solvent.

The method of the present invention had its origin in the observation that organic thionitrites were effective to improve the ignition quality of hydrocarbon fuels for compression ignition engines, which was attended by the further observation that the instability of organic thionitrites made their practical value in this regard questionable.

In preparing a fuel blend for compression ignition or Diesel engines with an organic thionitrite, the thionitrite may be added to the fuel in the pure state, it may be added to the fuel in solution in a suitable solvent, or it may be formed in situ in the fuel or in another suitable solvent, which in turn can be blended with the fuel. It is important, therefore, that the organic thionitrite be substantially stable against decomposition both prior to and after its addition to the fuel, and the present invention is broadly directed to a method for effecting such stabilization irrespective of the solvent in which it is dissolved. Typical solvents for the organic thionitrites are ether, carbon disulfide, carbon tetrachloride, and liquid hydrocarbons such as benzene, hexane, and petroleum fractions such as gasoline, kerosene, fuel oils and heavier fractions such as lubricating oils.

The organic thionitrites are compounds having the general formula RSNO. They may be synthesized in various ways as by the reaction of a mercaptan with nitrosyl chloride, or preferably by the interreaction of a mercaptan with an alkali nitrite and a mineral acid in a non-homogeneous liquid system as described in our copending application Serial No. 338,736 filed June 4, 1940.

Although, as aforesaid, this invention is broadly directed to the stabilization of organic thionitrites in solution irrespective of the solvent, the principal object of the present invention is to provide a method for stabilizing organic thionitrites in Diesel fuel oil blends containing same. The instability of organic thionitrites in Diesel fuel oil solutions manifests itself by the loss of the typical thionitrite color, development of sludge or sludgy materials and loss of the enhanced ignition quality.

Our invention is predicated upon the discovery that a Diesel fuel oil-organic thionitrite blend can be stabilized by admixing therewith a minor proportion of a compound which will prevent the accumulation of the higher oxides of nitrogen in the blend. This may be explained on the theory that the higher oxides of nitrogen apparently accelerate, by catalytic action and by direct reaction, the decomposition of the thionitrite and are instrumental in the formation of sludge and sludgy materials from constituents naturally occurring in the fuel oil.

Thus, the accumulation of the higher oxides of nitrogen may be prevented by adding to the blend a compound which will absorb or react with such oxides as they are formed to form stable, harmless products.

In further explanation of the foregoing it has been shown (Ber. 59, 1314 (1926)) that organic thionitrites are subject to two types of decomposition: namely, "Thermal decomposition," which takes place slowly at room temperature and in which the thionitrite decomposes irreversibly to the disulfide and nitric oxide according to the following equation:

$$2RSNO \rightarrow R\text{---}SS\text{---}R + 2NO$$

and "Auto oxidation," wherein the thionitrite is rapidly decomposed in the presence of oxygen into the disulfide and nitrogen tetroxide according to the following equation:

$$2RSNO + O_2 \rightarrow R\text{---}SS\text{---}R + N_2O_4$$

The nitric oxide formed in the former decomposition is oxidized to the higher oxides which, as stated above, apparently act catalytically to accelerate the decomposition of the thionitrite and react with naturally occurring constituents in the oil, such as unsaturated hydrocarbons, etc., to form sludgy materials. The higher oxides of nitrogen ($N_2O_3$ and $N_2O_4$) also react with many of the thionitrites to set up chain reactions which ultimately lead to sulfonic acids, sulfones, etc., and oxides of nitrogen.

We have found that the compounds having the general formula

in which $R_1$ and $R_2$ represent alkyl, aryl, aralkyl, alkaryl, alkoxy or aroxy groups and $R_3$ may be hydrogen or a hydrocarbon group, may be effectively used to prevent the accumulation of oxides of nitrogen in an organic thionitrite solution such as the aforesaid Diesel fuel-thionitrite blend.

The foregoing general formula describes three distinct classes of compounds by virtue of the various possible substitutions therein. If $R_1$ and $R_2$ are both hydrocarbon radicals we have the formula for an alpha-gamma diketone. Thus, if R₁ and R₂ are methyl groups, the formula is that of a derivative of acetyl acetone,

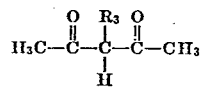

In this class of compounds, preference is given to acetyl acetone.

If R₁ and R₂ are alkoxy or aroxy groups, the formula is that of a diester of a malonic acid; that is, a diester of a substituted malonic acid, or of malonic acid. For example, if R₁ and R₂ are ethoxy groups, we have the formula for a derivative of diethyl malonate,

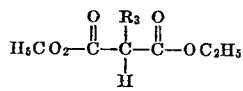

Where R₃ is H in the above formula, we have diethyl malonate which is a preferred compound of this invention.

Finally, if R₁ is a hydrocarbon radical and R₂ is alkoxy or aroxy, we have the formula for a beta-keto ester. Typical of this class of compounds is a derivative of ethyl acetoacetate wherein a methyl group and an ethoxy group are R₁ and R₂ respectively

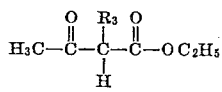

In this class of compounds, preference is given to ethyl aceto acetate.

To demonstrate the efficacy of the compounds contemplated herein as stabilizers for Diesel fuel oil-thionitrite blends, we prepared a Diesel fuel oil blend containing 1% of amyl thionitrite and representative stabilizers were added to samples of the blend, which were then stored in two sets under different conditions. One set was stored dry in glass bottles; the other was stored in glass bottles containing water and an iron nail. The effectiveness of the stabilizer was determined primarily by the length of time during which the red color of the thionitrite persisted and the length of time before there was an appearance of sludge in the oil. Table I below gives the results obtained with the samples stored "dry" and Table II sets forth the results obtained with the samples stored over 5% by volume of water with an iron nail in each sample. Both sets of samples were stored at prevailing room temperature.

TABLE I

*Samples stored "dry" in glass*

| Stabilizer | Per cent added by weight | Days elapsed before appreciable color loss | Days elapsed before appearance of sludge |
|---|---|---|---|
| None | | 5 | 3 |
| Do | | 5 | 5 |
| Ethyl acetoacetate | 2.5 | 5 | 19 |

TABLE II

*Samples stored over water in presence of iron*

| None | | <1 | <1 |
| Acetyl acetone | 2.5 | 64+ | |

It will be seen from the foregoing results that an organic thionitrite solution such as a Diesel fuel oil blend containing an organic thionitrite may be stabilized against deterioration by the addition thereto of compounds of the type contemplated herein which will prevent the accumulation of the oxides of nitrogen in the blend. The compounds contemplated herein may be added in varying proportions, depending upon the character of the thionitrite in the blend, the amount of same in the blend, etc., and in general they produce the desired stabilizing effect in amounts ranging from about 0.01 to about 5 times the quantity of thionitrite present in the solution.

We claim:

1. The method of stabilizing an organic thionitrite solution against deterioration which comprises admixing with said solution a minor proportion of a compound having the general formula,

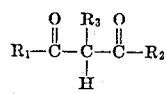

in which R₁ and R₂ are selected from the group consisting of alkyl, aryl, aralkyl, alkaryl, alkoxy and aroxy radicals; and R₃ is selected from the group consisting of hydrogen, and hydrocarbon radicals.

2. The method of stabilizing an organic thionitrite solution against deterioration which comprises admixing with said solution a minor proportion of an alpha-gamma diketone.

3. The method of stabilizing an organic thionitrite solution against deterioration which comprises admixing with said solution a minor proportion of acetyl acetone.

4. The method of stabilizing an organic thionitrite solution against deterioration which comprises admixing with said solution a minor proportion of a diester of a malonic acid.

5. The method of stabilizing an organic thionitrite solution against deterioration which comprises admixing with said solution a minor proportion of diethyl malonate.

6. The method of stabilizing an organic thionitrite solution against deterioration which comprises admixing with said solution a minor proportion of a beta-keto ester.

7. The method of stabilizing an organic thionitrite solution against deterioration which comprises admixing with said solution a minor proportion of ethyl acetoacetate.

8. The method of stabilizing a blend of Diesel fuel and an organic thionitrite against deterioration which comprises admixing with said blend a minor proportion of a compound having the general formula

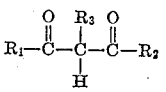

in which R₁ and R₂ are selected from the group consisting of alkyl, aryl, aralkyl, alkaryl, alkoxy, and aroxy radicals; and R₃ is selected from the group consisting of hydrogen and hydrocarbon radicals.

9. The method of stabilizing a blend of Diesel fuel and an organic thionitrite against deterioration which comprises admixing with said blend a minor proportion of an alpha-gamma diketone.

10. The method of stabilizing a blend of Diesel fuel and an organic thionitrite against deterioration which comprises admixing with said blend a minor proportion of acetyl acetone.

11. The method of stabilizing a blend of Diesel fuel and an organic thionitrite against deterioration which comprises admixing with said blend a minor proportion of a diester of a malonic acid.

12. The method of stabilizing a blend of Diesel fuel and an organic thionitrite against deterioration which comprises admixing with said blend a minor proportion of diethyl malonate.

13. The method of stabilizing a blend of Diesel fuel and an organic thionitrite against deterioration which comprises admixing with said blend a minor proportion of a beta-keto ester.

14. The method of stabilizing a blend of Diesel fuel and an organic thionitrite against deterioration which comprises admixing with said blend a minor proportion of ethyl acetoacetate.

15. A Diesel fuel oil having in admixture therewith an organic thionitrite and a compound having the general formula

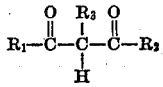

in which $R_1$ and $R_2$ are selected from the group consisting of alkyl, aryl, aralkyl, alkaryl, alkoxy, and aroxy radicals, and $R_3$ is selected from the group consisting of hydrogen and hydrocarbon radicals.

16. A Diesel fuel oil having in admixture therewith an organic thionitrite and a minor proportion of an alpha-gamma diketone.

17. A Diesel fuel oil having in admixture therewith an organic thionitrite and a minor proportion of acetylacetone.

18. A Diesel fuel oil having in admixture therewith an organic thionitrite and a minor proportion of a diester of a malonic ester.

19. A Diesel fuel oil having in admixture therewith an organic thionitrite and a minor proportion of diethyl malonate.

20. A Diesel fuel oil having in admixture therewith an organic thionitrite and a minor proportion of a beta-keto ester.

21. A Diesel fuel oil having in admixture therewith an organic thionitrite and a minor proportion of ethyl acetoacetate.

GEORGE S. CRANDALL.
RICHARD S. GEORGE.
EDWIN M. NYGAARD.